United States Patent
Li et al.

(10) Patent No.: US 7,913,081 B2
(45) Date of Patent: Mar. 22, 2011

(54) DYNAMIC CERTIFICATION OF COMPONENTS

(75) Inventors: Richard Ding Li, Somerville, MA (US); Robin Joel Landry, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 1114 days.

(21) Appl. No.: 11/148,254

(22) Filed: Jun. 9, 2005

(65) Prior Publication Data

US 2006/0282823 A1    Dec. 14, 2006

(51) Int. Cl.
   *H04L 29/06* (2006.01)
(52) U.S. Cl. ......... 713/157; 717/121; 717/124; 702/186
(58) Field of Classification Search .................. 713/157; 717/121, 124, 126, 141, 168–178, 4, 11; 714/38, 57, 43, 46, 47, 37, 1, 2, 100, 48, 714/25, 799, 4; 706/46, 25, 10, 1, 14, 23, 706/48, 52, 900, 903, 911; 707/202; 709/203, 709/201, 227, 229, 223, 224; 702/185
See application file for complete search history.

(56) References Cited

U.S. PATENT DOCUMENTS

| | | | |
|---|---|---|---|
| 5,548,718 A | | 8/1996 | Siegel et al. |
| 6,543,047 B1 | | 4/2003 | Vrhel, Jr. et al. |
| 6,598,223 B1 | | 7/2003 | Vrhel, Jr. et al. |
| 6,735,757 B1 | * | 5/2004 | Kroening et al. ............. 717/120 |
| 6,779,134 B1 | * | 8/2004 | Laviolette et al. ............. 714/38 |
| 6,862,696 B1 | * | 3/2005 | Voas et al. ....................... 714/38 |
| 7,092,987 B2 | * | 8/2006 | Brittingham et al. ......... 709/203 |
| 7,275,048 B2 | * | 9/2007 | Bigus et al. ..................... 706/46 |
| 7,389,216 B2 | * | 6/2008 | Parent et al. .................... 703/21 |
| 2003/0131085 A1 | * | 7/2003 | Zhang et al. ................... 709/223 |
| 2005/0222815 A1 | * | 10/2005 | Tolly ............................ 702/185 |

* cited by examiner

*Primary Examiner* — Thanhnga B Truong
*Assistant Examiner* — Narciso Victoria
(74) *Attorney, Agent, or Firm* — MH2 Technology Law Group LLP

(57) ABSTRACT

Embodiments of the present invention provide methods and systems for dynamically certifying components. Various entities may participate in the certification process. Operational data from live systems in use may also be collected and considered as part of the certification for a component. This information is then gathered into a database, which may be shared or made publicly available over a network, such as the Internet. In addition, in some embodiments, a proposed system may be certified. A proposed configuration may be submitted to a certification service. The certification service may then analyze the proposed system and determine whether there is a sufficient data to certify the proposed system.

20 Claims, 5 Drawing Sheets

DYNAMIC CERTIFICATION OF COMPONENTS

FIELD OF THE INVENTION

The present invention relates to the certification of components.

BACKGROUND OF THE INVENTION

In the computer industry, customers prefer to know which combinations of hardware components, hardware chipsets, firmware, software, etc. are compatible. Accordingly, most vendors test and certify the compatibility of their products. For example, independent software vendors (ISVs) and independent hardware vendors (IHVs) typically certify which of their products are compatible with a particular version of an operating system or version of software. Conventionally, the certification process involves running a suite of tests on one or more computer systems that include the product to be certified.

Unfortunately, the variety of configuration options of computing equipment has increased tremendously. There is now a wide range of options in processors, chipsets, peripherals, storage devices, device drivers available for use in computer systems. This results in a virtually endless range of possible configurations for computer systems. In addition, the available options for computer systems are constantly changing as products are updated or as new products are released. Thus, most vendors can only test their products in a limited number of configurations, which do not account for all of the available options. This increases the risk that a product will not work in a particular system.

Vendors could simply conduct more testing across a greater number of systems. However, such an increase in testing would prolong the time the vendor would take to bring their products to market. In addition, it would be difficult for vendors to track all of the various options and determine when sufficient testing has been conducted.

Accordingly, it may be desirable to provide methods and systems for efficiently certifying products. It may also be desirable to minimize the amount of testing required for certification so that vendors can release their products to the market more quickly.

SUMMARY

In accordance with one aspect of the present invention, a method for certifying at least one component with program code is provided. Information about configurations of a plurality of computer systems is gathered. At least one component that was included in the computer systems is identified and program code that was included in the computer systems is identified. A compatibility of the at least one component with the program code is then certified based on the configuration information.

In accordance with another aspect of the present invention, a method of certifying compatibility of at least one component with program code is provided. Configurations of computer systems that include the at least one component and the program code are gathered. A reliability of the at least one component with the program code is determined. A compatibility of the at least one component with the program code is then determined based on the reliability.

In accordance with yet another aspect of the present invention, a method is provided for certifying a computer system or model of a computer system. A proposed configuration for the computer system is received. The computer system includes at least one component and a set of program code. The proposed computer system is then certified based on the history of the at least one component and the set of program code.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Figure 1:
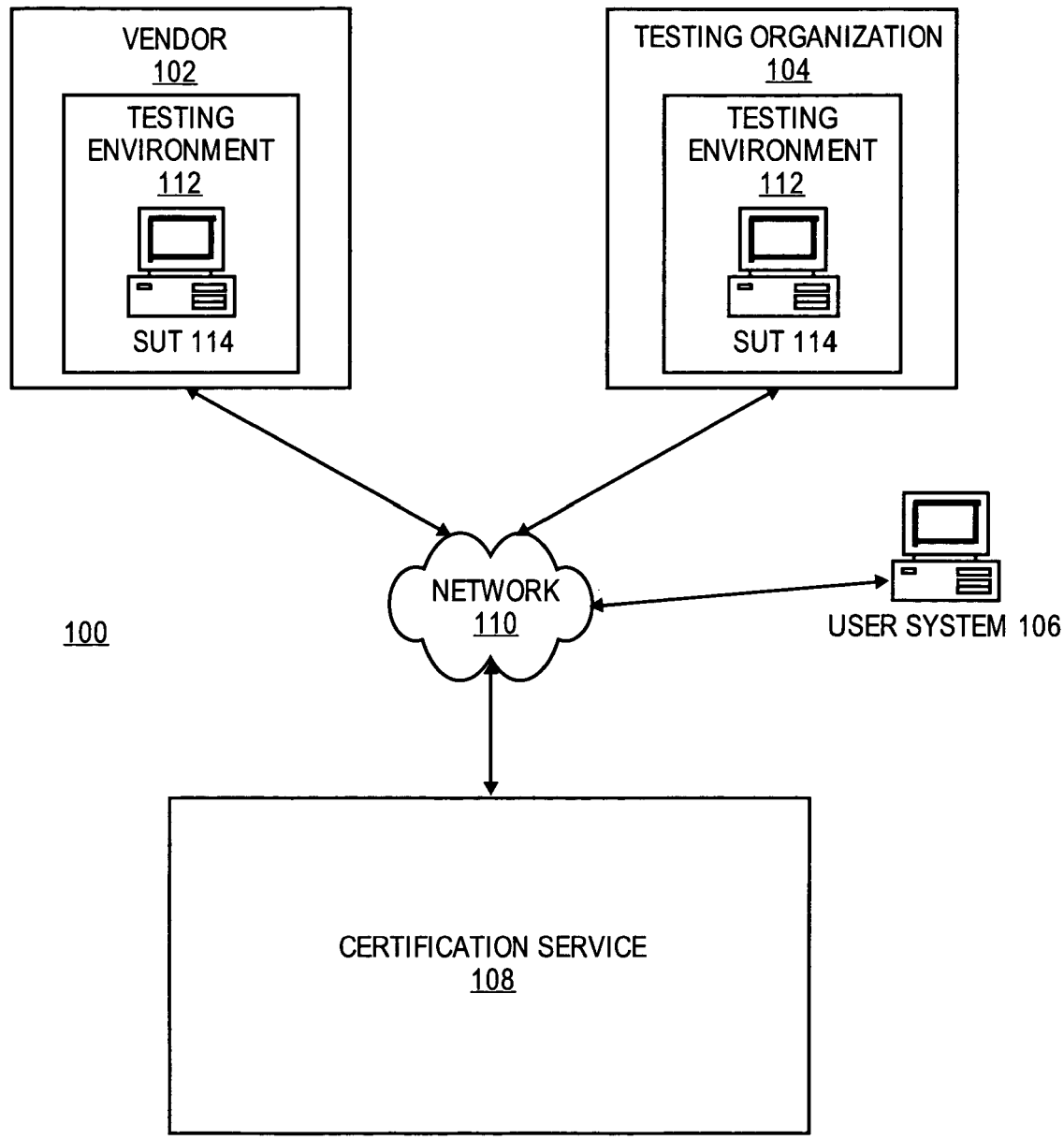
FIG. 1 shows an exemplary system for certifying components and program code.

Embodiments of the present invention provide methods and systems for dynamically certifying components. Some embodiments provide an environment in which various entities may participate in the certification process. For example, testing may be performed by various entities, such as the vendors themselves, an independent testing center, or a laboratory, etc. In other embodiments, the testing may be performed on systems that include the component to be certified and may be conducted based on a standardized test suite. Operational data from live systems in use may also be collected and considered as part of the certification for a component.

The testing information is then accumulated into a database, which may be shared or made publicly available over a network, such as the Internet. Thus, embodiments of the present invention allow an entity to leverage the testing of other entities and reduce the amount of work required by an individual entity to certify a component. In addition, certain information may be re-used when certifying a component.

A component may be certified in a variety of ways consistent with the principles of the present invention. For example, a component may be certified if it has been part of systems that have consistently or always passed certification tests. As another example, a component may be certified if it has been part of a certain number of different types of systems that have passed certification tests. As yet another example, a component may be certified if it has been part of systems that have the same program code, such as the same operating system version or device driver.

The certification of a component may be updated over time. For example, as a history of information is accumulated, a component's reliability with other components or program code may be determined. Based on this reliability, the certification of that component may be updated, or a new certification may be issued. Alternatively, a component's certification may be set to expire within a certain time frame, or may be revoked, if it's history of reliability is poor. Of course, other after-the fact analysis may be conducted on the database of information and considered when updating the certification of components.

A proposed system also may be certified based on the information in the database. For example, an enterprise, vendor, or company may wish to create a custom or "build-to-order" system. In these instances, the proposed configuration may be submitted to a certification service. The certification service may then analyze the proposed system and determine whether there is a sufficient history to estimate that the system will operate properly. If so, the certification service may certify the proposed system even before it has been built or fully tested. The certification service may also analyze the configuration information and testing results and propose a corrective course of action to obtain certification. Of course, the certification of the proposed system may be updated based upon later testing or operational data as noted above.

Reference will now be made in detail to embodiments of the invention, examples of which are illustrated in the accompanying drawings. For purposes of explanation, FIGS. 1-5 are described with reference to certifying the compatibility of a component from a vendor with one or more sets of installed program code. The component may be any form of hardware, software, firmware, or the like. The installed program code may generally refer to various types of software, such as the operating system, device drivers, and the like that are installed on a system. For example, the program code may be a particular distribution of software, an operating system kernel (such as a LINUX kernel), a device driver, and the like. However, one skilled in the art will recognize that the certification processes of the present invention may be applied to confirm the compatibility of any combination of hardware or software that is desired.

Figure 2:
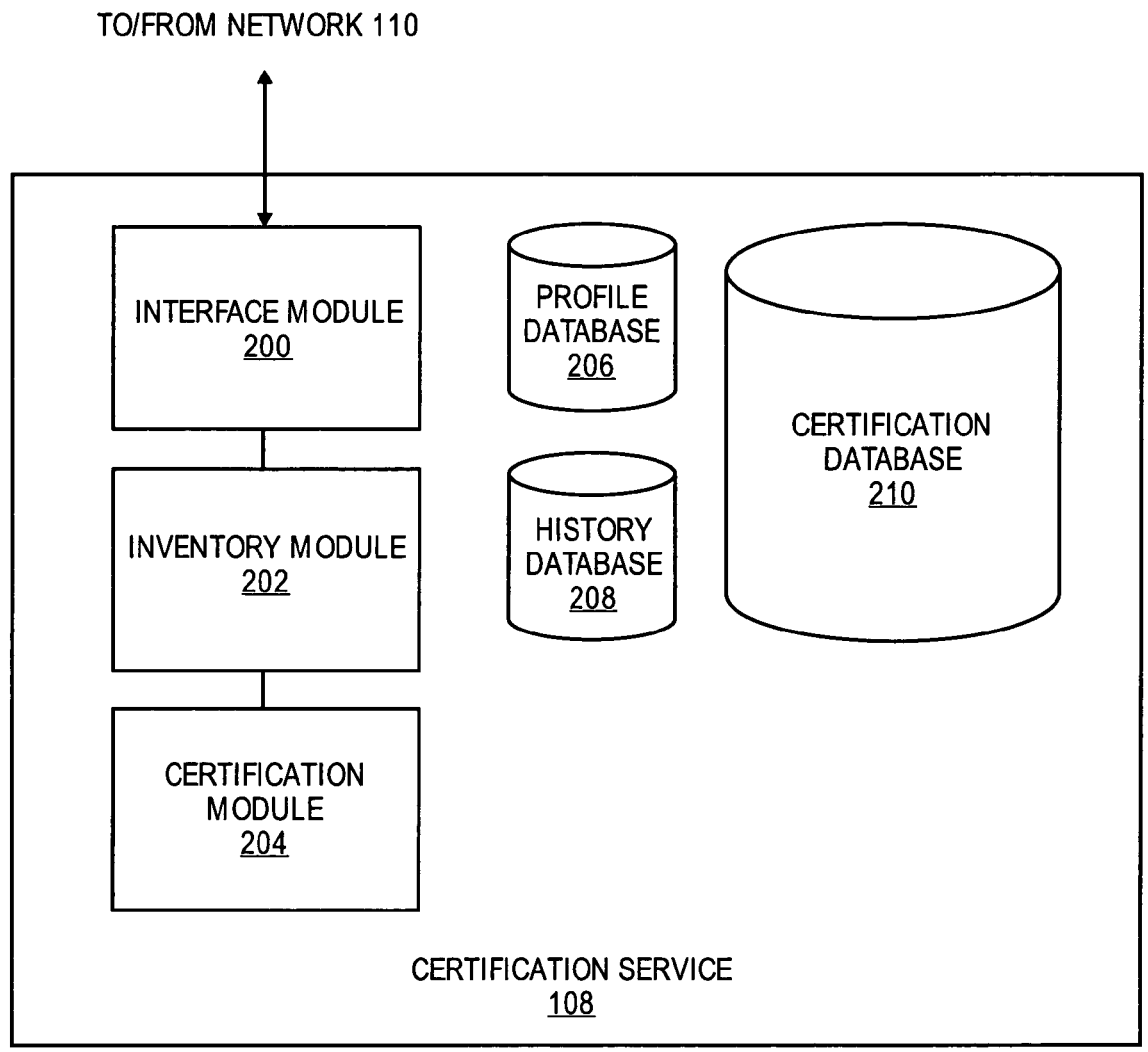
FIG. 2 shows an exemplary architecture for a certification service that may be part of the system shown in FIG. 1.
Figure 3:
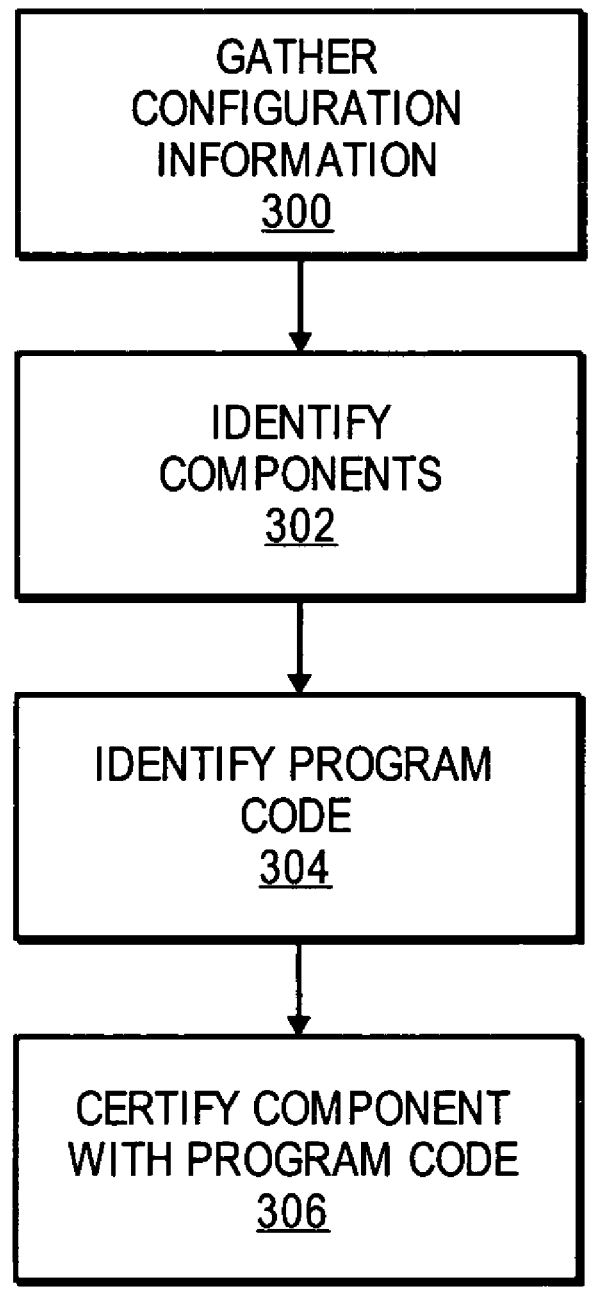
FIG. 3 shows a flowchart in which the compatibility of a component and program code are certified based on information about configurations of a plurality of computer systems.
Figure 4:
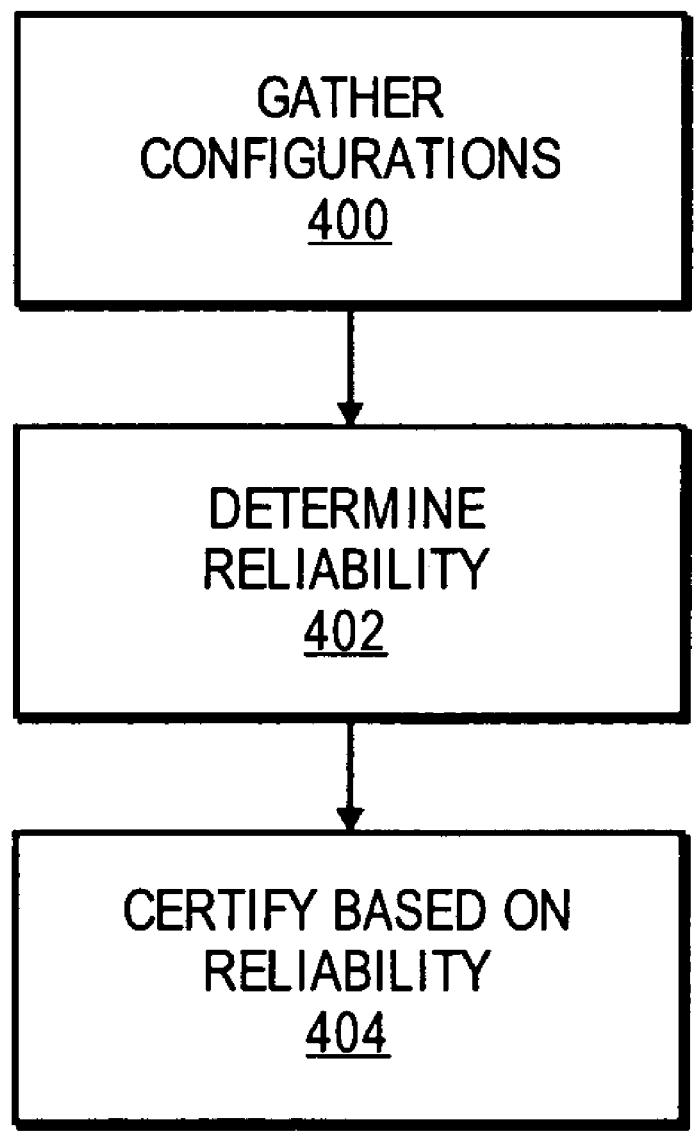
FIG. 4 shows a flowchart in which the compatibility of a component and program code are certified based on a reliability of the component with the program code.
Figure 5:
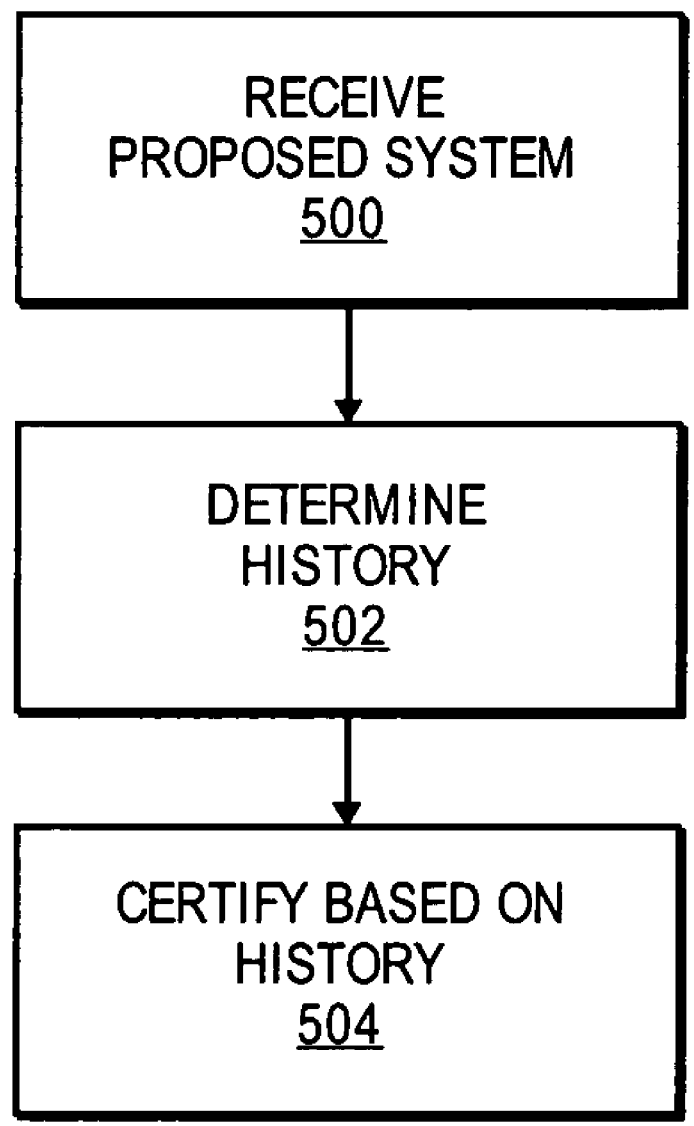
FIG. 5 shows a flowchart in which a proposed configuration for a system is certified.

FIGS. 1-2 illustrate generally the systems that may be used to certify components in accordance with the principles of the present invention. Specifically, FIG. 1 shows an exemplary system for certifying components and program code. FIG. 2 shows an exemplary architecture for a certification service that may be part of the system shown in FIG. 1. FIGS. 3-5 relate to various certification processes that are consistent with the principles of the present invention. In particular, FIG. 3 shows a flowchart in which the compatibility of a component and program code are certified based on information about configurations of a plurality of computer systems. FIG. 4 shows a flowchart in which the compatibility of a component and program code are certified based on a reliability of the component with the program code. FIG. 5 shows a flowchart in which a proposed configuration for a system is certified. Wherever possible, the same reference numbers will be used throughout the drawings to refer to the same or like parts.

FIG. 1 shows an embodiment of a system 100 for dynamically certifying components in accordance with the principles of the present invention. As shown, system 100 may include a vendor 102, a testing organization 104, a user system 106, and a certification service 108. Although FIG. 1 depicts a single vendor, testing organization, and user system, embodiments of the present invention may accommodate any number of such entities.

The entities of system 100 may communicate with each other in a variety of ways. For example, as shown in FIG. 1, the entities of system 100 may be coupled through a network 110. Network 110 may be implemented using the Internet, a local area network, a wide area network, or some combination thereof.

Alternatively, the entities of system 100 may communicate with each other indirectly. For example, vendor 102 and testing organization 104 may provide to and receive its information from certification service 108 in the form of a computer readable medium, such as a compact disc.

The specific entities of system 100 shown in FIG. 1 will now be further described. Vendor 102 may be any provider of hardware or software, such as an ISV or IHV. Vendor 102 may also provide various other services related to its products, such as update information, technical support, and the like. Vendor 102 may provide these products and services directly or indirectly.

In some embodiments, vendor 102 may implement a testing environment 112 to perform certification testing for its components. In particular, vendor 102 may implement testing environment 112 to test one or more of its components using a system-under-test ("SUT") 114. Although FIG. 1 shows vendor 102 with a single testing environment 112 and SUT 114, one skilled in the art will recognize that vendor 102 may operate any number of these systems. Exemplary implementations of testing environment 112 and SUT 114 will now be further described.

Testing environment 112 may comprise one or more servers and testing software. Such equipment and software are well known to those skilled in the art. The equipment of testing environment 112 controls and monitors the testing of SUT 114. In addition, the equipment of testing environment 112 may report the results of any testing back to certification service 108. In some embodiments, testing environment 112 is configured based on requirements provided by certification service 108. For example, the servers of testing environment 112 may be required to have a minimum processor speed, a certain type and amount of memory, a specific operating system distribution or version, and the like. In addition, the servers of testing environment 112 may run a testing software application or testing kit that is provided by certification service 108. In some embodiments, vendor 102 may register or establish an account with certification service 108 for testing environment 112 for authentication purposes and for controlling the sharing of its information with the other entities of system 100.

SUT 114 includes the component (from vendor 102) and the program code that is to be certified. SUT 114 may include, for example, a motherboard, one or more central processing units, one or more peripherals, one or more storage devices, an operating system, a basic input/output systems ("BIOS"), one or more software applications, and various device drivers. SUT 114 may also include components, such as a chipset, a network interface card, a video card, and an audio card. One skilled in the art may also refer to SUT 114 as equipment under test ("EUT"). In some embodiments, the configuration of SUT 114 may be determined based on requirements from certification service 108. For example, certification service 108 may provide vendor 102 various requirements regarding the minimum number and types of components and their respective certification level that is required for SUT 114. Typical requirements may relate to minimum or maximum amounts of memory, central processing unit types, chipsets, storage devices, peripherals, an operating system distribution, one or more operating system kernel versions, device drivers, and the like. Of course, one skilled in the art will recognize that the requirements for SUT 114 may vary based on the components and program code that are to be certified.

Alternatively, vendor 102 may have its certification testing performed by another entity, such as testing organization 104. For example, testing organization 104 may be an organization that specializes in testing for certification purposes. These organizations, such as National Software Testing Labs, are well known to those skilled in the art. In some embodiments, testing organization 104 may be sponsored or authorized by the same organization that operates certification service 108. As shown in FIG. 1, testing organization 104 may also implement its own testing environment 112 to test a system, such as SUT 114. Of course, one skilled in the art will also recognize that vendor 102 and testing organization 104 may conduct certification testing alone or in combination with each other.

In addition to the testing performed by vendor 102 and testing organization 104, system 100 may collect and consider information from live systems that are in use, such as user system 106. User system 106 may be any known type of computer or computer system that implements either the component or the program code that was certified. In some embodiments, user system 106 may be any device having the Linux operating system installed as well as various components from ISVs and IHVs. Such systems are well known to those skilled in the art. One skilled in the art will also recognize that user system 106 may be devices that use other operating systems, such as the Windows™ operating system and the UNIX™ operating system.

In some embodiments, user system 106 may be configured to provide operational data about its performance. For example, user system 106 may transmit operational data about its performance over network 110 to certification service 108 or back to vendor 102. In some embodiments, user system 106 may use well known techniques, such as encryption and digital signatures to secure the transmission of this information over network 110.

User system 106 may incorporate instrumented program code and sensors to collect and report operational data, such as processor load, memory utilization, and failure data. In some embodiments, instrumented program code is only distributed to user system 106, if the user consents to its use. Alternatively, user system 106 may include instrumented program code as part of a beta-testing program or post commercial release program. The number of participating user systems 106 may be determined by vendor 102 or certification service 108.

Information gathered about user system 106 may include operational data, such as the operating system version, service level, type of central processing unit, memory, disk space, and applications installed. Other information may also be recorded, such as start time, number of concurrent threads/processes started, exceptions, software errors, terminations, and the like.

User system 106 may transmit this data over network 110 in raw or processed form. For example, user system 106 may use a well known data exchange protocol, such extensible markup language ("XML"). User system 106 may also be configured to transmit its operational data at various times. For example, user system 106 may send operational data upon an abnormal termination, or on a periodic basis. As noted, user system 106 may secure the transmission of this information over network 110 using well known techniques, such as secure sockets layer ("SSL").

Certification service 108 provides infrastructure and business logic for certifying components. In some embodiments, certification service 108 is implemented as a website or part of a website on the Internet. Accordingly, certification service 108 may include any number of conventional servers (not shown). Such servers may be implemented with an Intel-based processor that executes an operating system, such as the LINUX operating system. Furthermore, the servers of certification service 108 may support TCP/IP communications for connecting to the other components of system 100, such as vendor 102, testing organization 104, or user system 106, over the Internet.

Of course, one skilled in the art will recognize that certification service 108 may include any amount of sufficient hardware to support a relatively large amount of certification information, such as testing results and operational data, and other operations. One example of an architecture for certification service 108 is shown with reference to FIG. 2.

As noted above, network 110 provides a communication infrastructure for system 100. Network 110 may be implemented based on known topologies and components. For example, network 110 may be implemented based on one or more local area networks, such as an Ethernet network, a wide area network, the Internet, or the like. Of course, network 110 may include other well known network elements, such as firewalls, hubs, switches, and the like.

Referring now to FIG. 2, an exemplary architecture for certification service 108 is shown. Certification service 108 may include a number of executable components and database structures useful for certification. As shown, certification service 108 may include an interface module 200, an inventory module 202, and a certification module 204. These components may be implemented based on known components of hardware and software. For example, these components may be implemented as applications running on one or more conventional servers. In some embodiments, the servers of certification service 108 run applications and the LINUX operating system. The functions of these exemplary components of certification service 108 will now be described.

Interface module 200 may be configured to manage communications between certification service 108 and the other entities of system 100, such as vendor 102 and testing organization 104. For example, interface module 200 may be configured to periodically poll vendor 102 and testing organization 104 on a regular basis to request configurations or configuration information that may include testing results and operational data for various systems (such as SUT 114 or user system 106). As another example, interface module 200 may be configured to passively monitor and receive configuration information from vendor 102 or testing organization 104.

The configuration information from vendor 102 or testing organization 104 may include a wide variety of data and may be in any format. For example, information from vendor 102 may be in the form of a file, such as an XML file, or a network location, such as a uniform resource locator (URL) on the Internet. Alternatively, interface module 200 may be configured to obtain information from vendor 102 or testing organization 104 by searching the Internet to identify who has released testing results or operational data recently. Software vendor interface module 200 may then download this information into history database 208, or store one or more network locations, such as URLs, where the download can be obtained.

In addition, interface module 200 may provide one or more pages for authenticating the identity of vendor 102, testing organization 104, or user system 106, such as a user ID, password, digital certificates, and the like. This information may be manually entered by a user, or may automatically provided once a connection is established. Interface module 200 may be configured to collect other information, such as contact information, a mailing address, an email address, and payment information. Of course, interface module 200 may also provide instructions and a process for registering a new entity or enterprise that wishes to participate with certification service 108. In some embodiments, this information may be stored in and retrieved from profile database 206.

Inventory module 202 analyzes the configuration information gathered from vendor 102, testing organization 104, and user system 106 to identify the various hardware and software components and the program code that were tested as part of a system, such as SUT 114. For example, inventory module 202 may be programmed to identify in SUT 114 the central processing unit and its architecture, the number of central processing units, the memory installed, the operating system kernel and its features, the device drivers installed, the BIOS installed, software applications installed, disk storage devices implemented, and peripherals supported. Of course, other types of information may be identified by inventory module 202.

Certification module 204 analyzes the information gathered from vendor 102, testing organization 104, and user system 106 to determine whether a particular component or set of program code should be certified and to what extent they should be certified. For example, certification module 204 may be configured to certify a component or set of program code based on one or more rules or a set of pre-defined criteria. Some exemplary rules or criteria may include: verifying that relevant certification tests have not failed on any SUT 114; verifying that relevant certification tests have passed on different types of SUTs, such as SUTs with different central processing units, different chipsets, different BIOS versions, or with components from different hardware vendors; and verifying that relevant certification tests were run on SUTs with the same operating system or with the same device drivers. Of course, one skilled in the art will recognize that other rules or criteria may be used to certify components.

In addition, certification service 108 may include one or more embedded databases. For example, as shown, certification service 108 may include a profile database 206, a history database 208, and a certification database 210. These databases may be implemented based on any known database technology, for example, as a relational or object oriented database. Of course, one skilled in the art will recognize that certification service 108 may include or be coupled to other databases, such as a database that maintains information about the products from vendor 102, or information about user system 106. The exemplary databases shown in FIG. 2 will now be described.

Profile database 206 includes information related to authenticating a user or entity, such as vendor 102 or testing organization 104, and determining their respective rights to the configuration information gathered by certification service 108. For example, vendor 102 or testing organization 104 may be given access rights to their previous testing results and to the testing results of other entities under certain circumstances.

Other information that may be included in profile database 206 may comprise group and individual permissions of users belonging to vendor 102 or testing organization 104, authorized partners of these entities, and contact information.

History database 208 stores the information gathered from the entities of system 100. For example, history database 208 may store the raw test result information generated by vendor 102 and testing organization 104, as well as operational data from user system 106. Typical information that may be included in history database 208 may relate to a product description of SUT 114, driver files, information about the host bus adapter of SUT 114, the test suite and software used to test SUT 114, the program code that was installed on SUT 114, and information that identifies the respective vendors of hardware and software in SUT 114.

Certification database 210 provides a catalog of components that are certified. For example, certification database 210 may provide information that indicates which components of hardware have been tested and certified with various sets of program code, such as operating system kernels, device drivers, BIOS, and the like.

One skilled in the art will recognize that certification database 210 may be configured to provide its information in a variety of formats. For example, certification database 210 may be configured to provide certification information that is sorted by vendor name, component name, component type, hardware platform type, central processing unit type, peripheral type, software platform type, software application, operating system version, BIOS version, date, and the like.

Various processes for certifying components will now be described with reference to FIGS. 3-5. Referring now to FIG. 3, a flowchart is shown in which the compatibility of a component and program code are certified based on information about configurations of a plurality of computer systems. In stage 300, certification service 108 gathers information from the other entities of system 100 that have conducted testing via interface module 200. The gathered information may relate to the configurations of any number of computer systems, such as SUT 114, and may indicate the testing results for these systems.

A plurality of different parties or entities may conduct testing, such as vendor 102 and testing organization 104. The testing conducted by these entities may depend upon information provided by certification service 108. For example, if SUT 114 is a significantly new or different system that has not been tested, then vendor 102 or testing organization 104 may perform a full suite of tests. However, if SUT 114 has components and program code that have a history of testing, then vendor 102 or testing 104 may perform a reduced or different suite of tests. For example, if SUT 114 is a two processor system and a four processor system was previously tested, then certification service 108 may permit a reduced suite of tests or a different suite of tests. As another example, certification service 108 may allow reduced testing when SUT 114 comprises: a well known processor family; a less capable or slower speed central processing unit than what was tested before; a well known chipset; a well known operating system version; or a set of well known device drivers. One skilled in the art will recognize that certification service 108 may use other criteria or rules to determine when reduced testing is appropriate.

The entity conducting the test may receive general testing requirements from certification service 108, or may retrieve a specific set of testing requirements for SUT 114 from certification service 108. For example, prior to testing SUT 114, vendor 102 or testing organization 104 may access interface module 200. Vendor 102 or testing organization 104 may then be prompted for authentication information. Upon authentication, vendor 102 or testing organization 104 may access some or all of the information of certification service 108. Such rights may be determined based on the information in profile database 206 and enforced by interface module 200. For example, vendor 102 may be restricted from accessing testing information provided from certain vendors (such as direct competitors), but allowed to access information provided by cooperating vendors (such as well known partners). Likewise, testing organization 104 may access the testing information of its clients and customers. These rights and restrictions may be specified during the registration process and determined by certification service 108. This allows an entity to intelligently determine how much testing to perform on SUT 114. Therefore, various entities may leverage the experience and testing of other entities and may also protect the confidentiality of its own data. Certification service 108 may also assist the testing conducted by vendor 102 or testing organization 104. For example, certification service 108 may provide one or more tools and documentation. Upon completing a suite of tests, the entities of system 100 may then transmit the testing results over network 110 to certification service 108.

In some embodiments, the gathered information is standardized based on requirements distributed by certification service 108. For example, certification service 108 may require that vendor 102 or testing organization 104 provide configuration information that includes a product description, names of driver files, information about the configuration of testing environment 112, the hardware platform of SUT 114, and the program code installed on SUT 114. In addition, the gathered information may indicate testing results in various forms, such as a numeric score or pass/fail indication. Of course, other information may be gathered by certification service 108.

In stage 302, inventory module 202 parses the gathered information and identifies the components, such as the components of hardware that were part of SUT 114. For example, inventory module 202 may identify the central processing unit, the memory, the storage devices, the peripherals, and the like that comprise SUT 114. In addition, inventory module 202 may determine other components that are available to be included in SUT 114. For example, inventory module 202 may query certification database 210 based on the gathered information to determine the other components that are available with a particular component or set of program code.

In stage 304, inventory module 202 parses the gathered information and identifies the program code that was installed on or intended to be used with SUT 114. For example, inventory module 202 may identify an operating system distribution installed on SUT 114, an operating system kernel, the BIOS, the device drivers, and other software applications that were installed on SUT 114. Inventory module 202 may then update various fields in history database 208 and certification database 210 to indicate which components and program code have been tested. Of course, one skilled in the art will recognize that inventory module 202 may perform stages 302 and 304 in any order or simultaneously. Processing may then flow to stage 306.

In stage 306, certification module 204 may retrieve data from history database 208 and certification database 210 and determine whether to certify the compatibility of a component with a particular set of program code. For example, certification module 204 may decide to certify a component based on a set of rules or pre-determined criteria. In some embodiments, certification module 204 is configured to certify a component if it has passed all tests that have been performed to date. Of course, one skilled in the art will recognize that the certification may be subject to a minimum number of tests or systems that are relevant to the component. Certification module 204 may also certify a component, if that component has been part of different systems that have nonetheless passed their testing. The differences between the systems may relate to the central processing unit, chipsets, BIOS version, or manufacturer. For example, certification module 204 may certify a component if it has been part of at least three different systems that were tested. Of course, this threshold may be modified to any number of different systems or based on the extent of the differences between the systems tested. As another example, certification module 204 may certify a component if it has been tested repeatedly on systems with the same program code, such as the same operating system kernel version or the same device driver.

In addition, certification module 204 may certify a component even if it was not tested in the exact same system configuration in previous tests. For example, a component in SUT 114 may be certified if it includes other available components that were not previously tested. Certification module 204 may model systems, such as SUT 114, in these configurations based on the configuration information gathered. The models used by certification module 204, for example, may be based on: the central processing unit family or architecture; the chipset; the BIOS; the front side bus; the motherboard; the operating system and version; and the device drivers. Furthermore, certification module 204 may "passively" certify a component based on the testing performed by vendor 102 or testing organization 104. Passive certification may refer to any certification in which certification service 108 substantially relies on the testing performed by another party. This reliance may even extend to allowing, for example, vendor 102 and testing organization 104 to determine at least some of their own testing requirements. For example, certification service 108 may implement one or more rules into certification module 204 that allows a component to be automatically certified based on the testing that was previously performed by vendor 102. This may be appropriate in various circumstances where certification service 108 wishes to acknowledge or leverage the extent of testing performed by vendor 102 or testing organization 104. Certification service 108 may also use passive certification in instances where vendor 102 is releasing a new component or system, and thus, previous testing requirements from certification service 108 may be obsolete or inapplicable. One skilled in the art will recognize that other forms of certification that are passive may be implemented in embodiments of the present invention. Accordingly, certification module 204 may be flexible or dynamic in the manner in which it uses the configuration information gathered from vendor 102 or testing organization 104.

Once certification module 204 has certified a component, certification service 108 may then take various actions to make the certification known to the other entities of system 100 and/or the public. For example, certification service 108 may post a notice or bulletin on a website. Certification service 108 may also send a message or notice to vendor 102 or testing organization 104. In turn, these entities may then publicize this information on their respective websites. In addition, certification service 108 may issue a distinguishing logo or certificate that indicates a component has been certified. One skilled in the art will recognize that certification module 204 may use a variety of known mechanisms to make a component's certification widely known. Alternatively, authorize vendor 102 or testing organization 104 may be authorized to issue a certification on behalf of certification service 108.

FIG. 4 shows a flowchart in which the compatibility of a component and program code are certified based on a reliability of the component with the program code. In stage 400, certification service 108 gathers information about systems, such as SUT 114 via interface module 200.

In addition, certification service 108 may also gather operational data on systems that are the same or similar to SUT 114, such as user system 106. The operational data may come from user system 106 or may come indirectly via vendor 102 or testing organization 104. For example, vendor 102 may have a beta testing or post-commercial release program in which operational data is collected from live systems that are in use. This operational data may be performance data, such as processor utilization, memory utilization, and the like. The operational data may also be the result of trouble tickets or failure reports that have been provided by user system 106.

As the information is received, interface module 200 may then continuously store the information to history database 208 and certification database 210. Processing may then flow to stage 402.

In stage 402, certification module 204 may determine a reliability of a component with a particular set of program code. For example, certification module 204 may query history database 208 and certification database 210 and determine the history of testing and/or operations of the component with the program code. For example, if the component has successfully passed testing over a long period of time (such as few months or over a year), then certification module 204 may assign the component with a high reliability. Conversely, if certification module 204 receives information in which the component has failed several tests (such as in later tests with different systems), then certification module 204 may assign the component with a lower reliability, or may even revoke the certification altogether. Certification module 204 may determine the reliability of a component with a particular set of program code based on well known statistical methods and software quality metrics. For example, based on the test results in the configuration information, certification module 204 may calculate a mean time to failure and mean time between failures for a component with a particular set of program code. As another example, certification module 204 may measure software quality metrics, such as the number of patches issued for a particular set of program code, the size of these patches, and the like.

The reliability indication of a component or program code may be formatted in various ways, such as single value, or set of values, or set of codes. In some embodiments, a hierarchical scale is used to indicate the reliability and confidence of the certification by certification service 108. Certification module 204 may then update one or more files in certification database 210 and history database 208. Processing may then flow to stage 404.

In stage 404, certification module 204 may update or issue a new certification for the component based on its reliability. For example, certification module 204 may have initially issued a first certification based on testing as described above with reference to FIG. 3. However, over time, additional testing may have been performed by vendor 102 or testing organization 104 that is still relevant to the component and program code. Alternatively, operational data from user system 106 may become available. Thus, certification module 204 may upgrade the certification of a component to a higher level when the component has established a high reliability. Conversely, certification module 204 may downgrade the certification of a component to a lower level or revoke the certification when the component has failed relevant tests or when failure data has been received.

Certification levels may be indicated in various ways. For example, the certification may use a numerical scale in which increasing (or decreasing) values indicate a different level of reliability. Alternatively, an alphabetical scheme may be used. For example, the letter "A" may indicate the highest level of certification, the letter "B" may indicate a lower level, and so forth. Of course, other labeling schemes may be used alone or in combination to indicate varying levels of certification.

FIG. 5 shows a flowchart in which a proposed configuration for a system is certified. In some instances, an entity, such as vendor 102, may wish to build or release a new component or system. For example, vendor 102 may provide the ability to create a build-to-order or custom system.

However, known certification systems and processes will generally not certify such a system or component until after significant testing. This is because known certification processes will only certify the exact system that was previously tested. In contrast, in some embodiments, an entity may submit a proposed configuration for a system and have it certified by certification service 108. One example of such a process will now be described with reference to FIG. 5.

In stage 500, certification service 108 receives a proposed configuration from an entity, such as vendor 102, via interface module 200. The proposed configuration may be in many forms. For example, interface module 200 may provide one or more web pages with forms that relate to various aspect of the proposed configuration of the system. Alternatively, an entity, such as vendor 102, may submit the proposed system using a well known data transfer protocol, such as XML.

The proposed configuration may specify some or all of the hardware and software of a system. Some items that may be specified in the proposed configuration include the type of central processing unit architecture, the central processing unit model, a hardware provider (such as Hewlett Packard, Dell, IBM, and the like), an operating system, a version of the operating system, and one or more desired software applications. Other items may also be specified, such as device drivers, host bust adapter, BIOS version, hard disk drive model, storage area networking information, LAN driver type and model, and a clustering solution. One skilled in the art will recognize that other items may be specified in the proposed configuration. In addition, the level of detail in the proposed configuration may also be varied.

In stage 502, interface module 200 passes the proposed configuration to inventory module 202. In turn, inventory module 202 may parse the proposed configuration and determine the components and program code that are part of the proposed configuration. Certification module 204 may then take this information and determine whether the proposed configuration will operate properly. Certification module 204 may then determine a history of relevant tests that have been run on these components and program code, or their equivalents.

Certification module 204 may attempt to find the exact configuration from the information in history database 208 and certification database 210. If the exact configuration is found, then certification module 204 may then make a certification decision based on this information alone. Certification module 204 may also perform various checks to determine if the proposed configuration will operate properly. In particular, certification module 204 may determine whether a component depends on one or more other components in the proposed system. For example, certification module 204 may check that the proposed system includes the proper versions of operating system files, the correct device drivers, and the like.

In the event that certification module 204 cannot find the exact configuration, then it may retrieve history and certification information of systems that include equivalent components or equivalent program code. For example, certification module 204 may search for system configurations that include at least one of: the same family of central processing units or stepping of a central processing unit; the same chipset; the same BIOS; the same front side bus; the same motherboard; the same operating system kernel; or the same device drivers. Certification module 204 may then analyze this information and determine if there has been sufficient testing to issue a certification. Of course, if further information is needed about the proposed configuration, interface module 200 may provide a warning message, request more information, or instruct the entity to conduct testing on the proposed configuration. Processing may then flow to stage 504.

In stage 504, certification module 204 may determine an appropriate certification for the proposed system. When making this determination, certification module 204 may select a certification level based on the quality and history of data it retrieved. For example, if certification module 204 was able to find an exact or similar configuration to the one proposed, then certification module 204 may be able to issue a high level certification. In the event that certification module 204 was required to use other data, then the level of certification may depend on the closeness of the information found as well as the amount of history available. As another example, certification module 204 may rely on the extent of testing performed to determine the appropriate certification. In particular, certification module 204 may passively issue a low level certification if vendor 102 or testing organization 104 has performed a lesser extent of testing. Conversely, certification module 204 may passively issue a high level certification if vendor 102 or testing organization 104 has performed a higher extent of testing, even if the history of testing is relatively short. In addition, certification module 204 may be configured to suggest modifications or settings that will assist the certification of the proposed system. For example, certification module 204 may include logic that evaluates the various dependencies between components and sets of program code. These dependencies may be learned from previous testing and indicated by the information in certification database 210 or history database 208. For example, the proposed system may include a peripheral that requires a specific version of a device driver. In addition, that device driver may be dependent upon a particular operating system kernel. Of course, one skilled in the art will recognize that other factors and weighting may be used to certify a proposed system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
  gathering a history of test results from a plurality of computer systems dedicated to testing program code;
  identifying, from the history of test results, at least one component that was included in the plurality of computer systems;
  identifying, from the history of test results, at least one program code that was included in the plurality of computer systems and that was reliable with the at least one component;
  certifying, by a certification server, that the at least one component is compatible with the at least one program code based on the at least one program code being reliable with the at least one component;
  collecting information about performance of one or more computer systems of the plurality of computer systems that include the at least one component and the at least one program code; and
  assigning a quality level to the certification based on the performance information.

2. The method of claim 1, further comprising generating a list of components that have been certified with the at least one program code.

3. The method of claim 1, wherein identifying, from the history of test results, the at least one component that was included in the plurality of computer systems comprises identifying at least one of a device driver, a chipset, a network interface card, a video card, a motherboard, a storage device, an audio card, and a processor.

4. The method of claim 1, wherein identifying, from the history of test results, the at least one program code that was included in the plurality of computer systems comprises identifying at least one of a software product, an operating system, and a basic input/output system software installed in the computer systems.

5. The method of claim 1, wherein identifying, from the history of test results, the at least one program code that was included in the plurality of computer systems comprises identifying an operating system kernel that was installed in the computer systems.

6. The method of claim 1, wherein identifying, from the history of test results, the at least one program code that was included in the plurality of computer systems comprises identifying an operating system kernel and a set of device drivers that were installed in the computer systems.

7. The method of claim 1, wherein identifying, from the history of test results, the at least one component that was included in the plurality of computer systems comprises:
  receiving a model of the plurality of computer systems; and
  parsing, from the model, hardware components included in or available with the plurality of computer systems.

8. The method of claim 1, wherein certifying that the at least one component is compatible with the at least one program code comprises certifying components that were selected as part of a build-to-order process.

9. The method of claim 1, wherein certifying that the at least one component is compatible with the at least one program code comprises certifying the at least one component with the at least one program code based on a set of rules.

10. The method of claim 1, wherein certifying that the at least one component is compatible with the at least one program code comprises certifying the at least one component with the at least one program code after a pre-determined threshold result has been achieved from the history of test results.

11. The method of claim 1, wherein certifying that the at least one component is compatible with the at least one program code comprises assigning a reliability level to the certification based on a set of rules.

12. The method of claim 1, wherein certifying that the at least one component is compatible with the at least one program code comprises assigning a reliability level to the certification based on the history of test results.

13. The method of claim 1, wherein certifying that the at least one component is compatible with the at least one program code comprises assigning a reliability level to the certification based on a number of patches that have issued for the at least one program code.

14. A system comprising:
  a plurality of computer systems dedicated to testing program code;
  a storage device configured to store a history of test results from the plurality of computer systems; and
  a processor configured to execute instructions comprising:
    identifying, from the history of test results, at least one component that was included in the plurality of computer systems;

identifying, from the history of test results, at least one program code that was included in the plurality of computer systems and that was reliable with the at least one component;

certifying that the at least one component is compatible with the at least one program code based on the at least one program code being reliable with the at least one component;

collecting performance information of one or more computer systems of the plurality of computer systems that include the at least one component and the at least one program code; and assigning a quality level to the certification based on the performance information.

15. A method of certifying a computer system, said method comprising:

receiving a proposed configuration for the computer system that includes at least one component and a set of program code;

gathering a history of test data for the at least one component and the set of program code within other computer systems dedicated to testing program code;

determining, from the history of test data, that the set of program code was reliable with the at least one component;

determining a certification of the computer system based on the set of program code being reliable with the at least one component;

issuing, by a certification server, the certification for the computer system;

collecting performance information of one or more computer systems of the plurality of computer systems that include the at least one component and the at least one program code; and assigning a quality level to the certification based on the performance information.

16. The method of claim 15, further comprising determining whether the at least one component has been previously certified with the set of program code.

17. The method of claim 15, further comprising:
gathering test data for the computer system; and
revoking the certification for the computer system based on the test data.

18. The method of claim 15, further comprising:
determining if new test data has been added to the history of test data; and
expiring the certification of the computer system based on a lack of new test data.

19. The method of claim 15, wherein determining the certification of the computer system is performed by a first party and comprises:

determining an extent of testing performed by at least one additional party on the at least one component and the set of program code; and certifying a compatibility of the at least one component with the set of program code in the computer system based on the extent of testing performed by the at least one additional party.

20. A system comprising:
a plurality of testing systems dedicated to testing program code;
a processor configured to execute instructions comprising:
receiving a proposed configuration for a computer system that includes at least one component and a set of program code;

gathering a history of test data for the at least one component and the set of program code within the plurality of testing systems;

determining, from the history of test data, that the set of program code was reliable with the at least one component;

determining a certification of the computer system based on the set of program code being reliable with the at least one component;

issuing the certification for the computer system;

collecting performance information of one or more testing systems of the plurality of testing systems that includes the at least one component and the set of program code; and assigning a quality level to the certification based on the performance information.

* * * * *